United States Patent [19]

Jenkins

[11] 4,366,611

[45] Jan. 4, 1983

[54] METHOD OF MAKING A GASKET-SEALED MOLDED DOOR AND FRAMING MEMBER ASSEMBLY

[75] Inventor: Donald Jenkins, Louisiana, Mo.

[73] Assignee: Astoria Fibra-Steel, Inc., Astoria, Ill.

[21] Appl. No.: 181,174

[22] Filed: Aug. 25, 1980

[51] Int. Cl.[3] .......................... B23P 17/00; B29D 3/02; B29D 9/00; B29G 3/00

[52] U.S. Cl. .......................................... 29/416; 49/501; 264/157; 264/261; 264/263

[58] Field of Search ..................... 29/416, 436; 49/501; 156/242, 250; 264/138, 154, 157, 261, 263

[56] References Cited

U.S. PATENT DOCUMENTS

| | | | |
|---|---|---|---|
| 2,970,347 | 2/1961 | Massopust | 49/501 |
| 3,822,462 | 7/1974 | Chubb | 29/416 |
| 4,179,790 | 12/1979 | Tornerfelt | 29/416 |

*Primary Examiner*—Ervin M. Combs

*Attorney, Agent, or Firm*—Jerome A. Gross

[57] ABSTRACT

Sealed, molded fiberglass doors and the framing members which surround them, such as used on utility trucks and other purposes, are in the present invention molded in a single piece. The door panel, originally formed recessed inwardly from the framing member, is bounded by an outward facing V-groove whose outer wall slopes toward the framing member. The integral molded part is then severed to divide the sloping outer wall into a framing member flange and the outer margin of a V-flange which bounds the door. On fitting the cut edge of this V-flange with a heavily cushioned channel gasket, and presenting the door against the flange of the framing member, a secure seal is effected without any tendency to pull the gasket off the door edge, even when frozen. Forming the parts integrally not only saves mold costs and material costs, but also assures perfect fit.

2 Claims, 2 Drawing Figures

METHOD OF MAKING A GASKET-SEALED MOLDED DOOR AND FRAMING MEMBER ASSEMBLY

BACKGROUND OF THE INVENTION

The present invention deals with molded doors and framing members, such as are constructed of molded fiberglass and used on utility trucks and the like. Such doors must fit precisely and sealedly, and yet must open readily under freezing conditions without any danger of pulling the sealing gasket from the door.

In making such doors and framing members by molding fiberglass, for example, the practice has been to construct separate molds for the door and for the framing member, so that the door might suitably overlap the framing member for sealing. The overlapping portion of the door may have an inward turned 90° flange, which is either gasketed or fits against a gasket in a channel-like recess around the opening in the framing member. Since the door panel and its framing member should be flush with each other, the complexity of such molds and the waste of material attendant to cutting and throwing away that material over the area of the door opening has increased the cost of this type of construction.

A further complexity is the fitting of doors, which may not fit precisely against the gaskets provided, and still another problem has been the securing of gaskets, either to the door or the framing member, sufficiently so that on pulling open a door frozen to the gasket at its point of contact, the gasket will not be displaced.

SUMMARY OF THE INVENTION

The present invention provides a method of making doors and their framing members in a single molding operation and then cutting apart to delimit a bounding flange on the door and an inner sloping flange on the framing member. At this stage of manufacture the intermediate article is such a molded piece, in which the door-forming portion is bounded by a groove having a sloping outer wall whose depth is substantially greater than that of its inner wall. By cutting through this outer wall of the groove the framing member is provided with an inner sloping flange while the separated door member is bounded by a generally V-shaped flange whose outer margin likewise slopes. In the embodiment described the door is completed by mounting on its forward outwardly presented cut edge, a gasket including an inverted channel portion and a large cushioning portion adjacent to the underside of the outer margin of the door flange. This cushioning portion has sufficient bulk to provide a snug seal when the door is presented outwardly of the framing member and pressed against its flange.

For improved strength and rigidity and for even better sealing, the deeper wall of the groove as originally molded—that is the wall which is to be cut—is formed with a small shoulder having a fairly sharp ridge presented outward. The shoulder reinforces the flange of the framing member. On cutting immediately below this shoulder, the ridge provides an edge which will seal against the door gasket with line contact. Much of the force exerted on the door is thus reacted in line contact along this ridge, resulting in exceptionally tight sealing, with the greater part of the cushioning portion of the gasket lying outwardly of the ridge and there presented against the flange of the framing member.

DESCRIPTION OF THE PREFERRED EMBODIMENT

Figure 1:
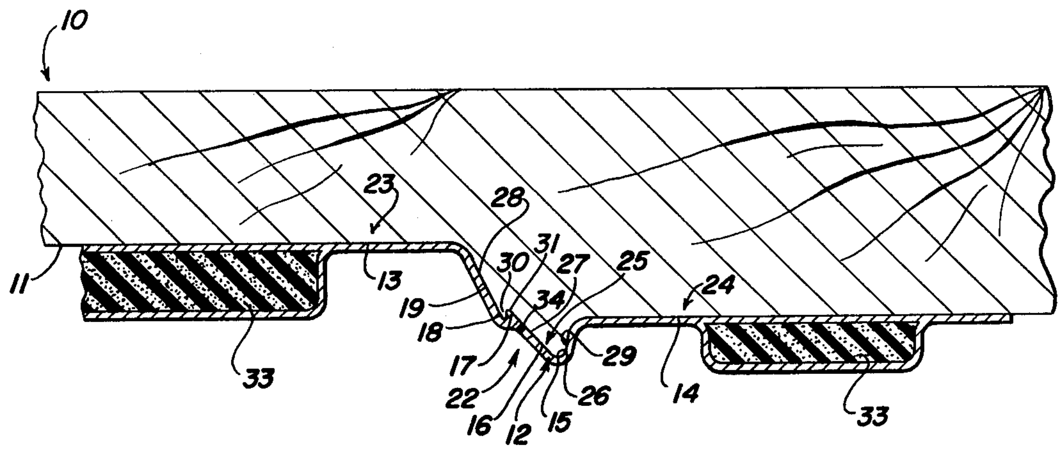
FIG. 1 is a fragmentary cross-sectional view through a mold member, shown somewhat schematically, and a typical portion of the one-piece intermediate article of manufacture which is to be severed to provide a framing portion and a door portion.

The fragmentary showing of FIG. 1 will be sufficient for understanding the present method of molding to create an intermediate article of manufacture from which a door and framing portion may be cut. The preferred embodiment illustrated is formed by molding fiberglass sheet, with suitable reinforcing material as shown, but other formable sheet materials may be substituted with obvious changes in procedure suitable for the materials utilized.

A wood mold generally designated 10 has a forward mold surface 11, duly treated so that the familiar Gelcoat finish process may be carried out. The mold surface 11 is divided by a mold ridge generally designated 12 into a framing member mold surface portion 13 and a door forming mold surface portion 14. As will be seen, the door forming member mold surface portion 14 projects substantially outward from the framing member surface portion 13, while the ridge 12, which bounds the entire door forming surface 14, projects further substantially beyond it to a ridge peak 15. The slope from this peak 15 down to the door surface forming mold portion 14 may be any slope convenient for molding, say 70°, while on the ridge side 16 outward of the peak the slope is preferably about 45°, back down the ridge almost to the same level along the mold to which the door framing portion projects. Here the outer sloping ridge surface 16 is provided with a narrow groove 17 and immediately adjacent ridge 18 which together make up a narrow slope-interrupting portion, outward of which the ridge slope portion 19 of the mold surface continues at a greater angle, which may be approximately 63°, to join the framing member portion of the mold.

Figure 2:
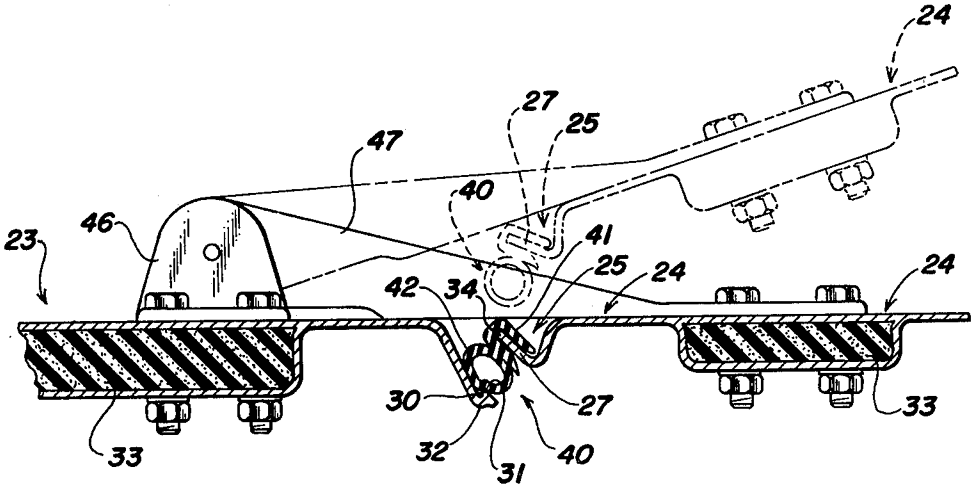
FIG. 2 is a similar fragmentary view of the framing and door portions after being severed from each other, with the door being gasketed and shown in closed position. A partially open position of the door is shown in phantom lines.

Against this mold surface sheets of fiberglass material duly impregnated with molding resin, and suitable reinforcing material, incorporated as shown in FIG. 1, are molded according to the Gelcoat process, to yield the intermediate article of manufacture shown in FIG. 1, to be subsequently cut into the door and framing members of FIG. 2. The intermediate article of manufacture will be described in reference to the portions delineated by the severing cut to be made about the entire door-forming member, which in the cross-section illustrated is at the point designated by arrow 22 in FIG. 1. So considered, it consists of a framing surface portion generally designated 23, a door forming portion generally designated 24 and a delineating flanging groove generally designated 25. As will be observed, the outer wall of the groove 25 consists of two sloping portions, that portion closer to the bottom 26 of the groove, which closer portion is designated 27, and outer groove portion 28 which is adjacent to the framing surface portion 23. Taken together, said portions 27, 28 of the groove provide substantially greater depth than its inner wall 29. The ridge and groove 18, 17 in the slope-interrupting portion of the mold ridge outer wall 16 cause the molded surface of the article to have a water collecting channel 30 and a closely adjacent ridge 31. The opposite side of the molded article immediately adjacent the line of cut 22, is thickened sufficiently to provide a bead-like reinforcement 32 and thus extra strength and ridigity. As shown hereafter, the ridge 31 provides sealing when the door and framing members are ultimately assembled with a gasket.

Reinforcements 33 molded within the framing member portion and the door forming portion 23, 24 respectively are conventional.

While the intermediate article so formed may be stored, shipped or sold intact, in order to provide an ultimately useful purpose the door forming portion 24 is cut from the framing member portion 23 by slitting at the level 22, preferably perpendicular to the molded surface as there formed. This leaves the severed door member 24 bounded by the closer portion 27 of the generally V-shaped reinforcing flanging groove 25 whose outward and forward sloping portion 27 terminates in an outer edge 34 which, as cut, stops short of the mold surface of the door 24. Considering the framing member 23, it has adjacent to its cut edge the groove 30, ridge 29 and reinforcement 31 which are together referred to as a step portion, in that they interrupt the two sloping portions 27, 28. The functioning of these will be made clear from a discussion of FIG. 2.

On cutting along the line 22, which cut is preferably made by slitting as narrowly as feasible, the door member generally designated 24 is removed. On its cut edge 34 is mounted a sealing gasket of conventional construction whose undistorted shape is best shown in the phantom line presentation of FIG. 2 while its distorted position on sealing is shown in solid lines. The gasket generally designated 40 has a channel forming portion 41, preferably wired for secure fit on the outer part 27 of the V-flange 25 which surrounds the door member 24; and further has a hollow cushioning portion 42 of much greater bulk, which, mounted as shown, is adjacent to the underside of the closer sloping portion 27. At that part of the channel portion 41 which surrounds the cut edge 34, its thickness is such as that, when the door is locked closed, the gasket 40 will not extend beyond the plane which forms the surface of the door member 24. The cushion portion 42 of the gasket is of such bulk that when mounted and closed as shown in FIG. 2, it will be somewhat compressed between the 45° slope of the portion 27 and the greater slope of the outer groove portion 28; and will likewise be indented by the ridge 31, leaving a space between it and the groove 30 to provide a channel to collect and lead off any possible moisture which may pass the gasket 40 or be trapped therein. Thus, a very secure line contact seal is provided along the ridge 31, while nearer the plane of the framing surface, there is a partially wedging contact between the outer flange portion 28 and the gasket, to provide great security.

The assembly is completed by suitable hardware, including a hinge clevis bracket 46 mounted to the framing member 23 and hinge 47 projecting therefrom. It is to be noted that the lower surface of the hinge may be flush with the plane in which the gasket 40 supports the door panel 24, being substantially the same plane as that of the outer surface of the framing member 23. Suitable latching provisions, not shown, are made to so hold the door 24 at this level, against the compressive resistance of the gasket 40.

Due to the slopes of the sloping portion 27 on the door 24 and the outer sloping portion 28 on the framing member 23, there is no tendency for the gasket to be forced out of position either by compression on closing or any tension on opening. The inward divergence of their slopes imparts to the compressed gasket an inward force component; it cannot slip outward. On opening, the forces which may be applied under extreme conditions will not pull off the gasket. For example, in event of freezing, drawing the door outward to the position shown in phantom lines would merely peel the gasket from the Gelcoat surface of the framing member flange 28.

Modifications in detail will be apparent. Some of the sealing security provisions in the present design may be dispensed without loss of total functioning of the invention; for example, the extra security provided by the ridge 31 and the difference in slope between the outer door flange margin 27 and the flange 28 of the framing member may not be necessary in all utilization; the proportions of the margin 27 and flange 28 may not be critical, nor the precise location of the line of cut; even if the line of cut should be irregular, where the door panel is still inserted within the framing member such irregularities will not be critical. Further, while mounting the gasket 40 from which it is cut, on the cut edge 34 makes the door member edges "soft" for handling, the gasket may in some instances be applied instead to the cut edge of the framing member flange 28. Changes in proportions may also be made if the door is not intended to close flush with the framing member. Such and other modifications will be obvious from this disclosure to those skilled in the art.

In the specification the term "generally V-shaped" is used for convenience of description of the flanges to be utilized and is to be construed to apply to any configuration of flanges whose portions slope at substantially different angles to a reference plane. Further, the phrase "substantially the same dimension" is used to take account of loss in width due to cutting.

I claim:

1. The method of making a door-like article to be sealed by a gasket against a flanged framing member, comprising the steps of preparing a single mold surface having a framing member mold surface portion, a door-forming member mold surface portion projecting outward therefrom, and a mold ridge bounding the door-forming member mold surface portion and projecting beyond it and then sloping toward said framing member mold surface portion, then molding fiberglass material conformably against said single mold surface only, to form a single-piece intermediate article of manufacture having a finished outer surface conforming to said single mold surface, which article of manufacture comprises a framing member portion and an integral door-forming portion bounded by a flanged substantially V-shaped groove conforming to said mold ridge, an outer wall of such groove sloping toward the framing member surface portion, then severing said framing member portion from the door-forming portion by cutting completely through the sloping outer wall of said flanging groove at an intermediate level thereof, to provide, severed from each other, a framing member bounded by an inwardly-sloping flange, and a door-like member bounded by a generally V-shaped flange having an outwardly and forwardly sloping outer end portion for mounting a gasket thereon positioning said door-like member on a hinged mounting assembly in a manner such that, in a closed position, said inwardly sloping flange of said framing member and said sloping outer end portion of said V-shaped flange of said door-like member define a cut opening therebetween, and said framing member flange extends slopingly inward of said outer end portion of said V-shaped flange in substantially parallel relationship therewith, providing a gasket having a channel portion on one edge and a cushioning portion on an opposite edge, and mounting said channel portion of the gasket around the sloping outer end portion of the V-shaped flange in a manner so that said cushioning portion of said gasket underlies an inner surface of said sloping outer end portion and faces an outer surface of said framing member flange, to effectively enlarge the door-like member so that, on closing the door-like member against the framing member, the cushioning portion of the gasket overlays and is compressed against said outer surface of the inward sloping flange of the framing member.

2. The method as defined in claim 1, wherein in the step of providing said mold ridge, an outer-sloping surface of said ridge is provided with a ridge and groove, and in the step of cutting of the intermediate article its portion-formed complementary to said ridge and groove is left on the flange of the framing member portion, to provide the framing member portion with a corresponding water-collecting channel and ridge.

* * * * *